United States Patent
Olsthoorn et al.

(10) Patent No.: US 11,422,573 B2
(45) Date of Patent: Aug. 23, 2022

(54) CONTROL LAWS FOR PEDAL-TO-ROLL COUPLING

(71) Applicants: BOMBARDIER INC., Dorval (CA); C SERIES AIRCRAFT LIMITED PARTNERSHIP, Mirabel (CA)

(72) Inventors: Matthew Olsthoorn, Pierrefonds (CA); Sylvain Therien, Longueuil (CA); Aymeric Kron, Beaconsfield (CA); Zhe Yan, Saint-Laurent (CA); Ilie Stiharu-Alexe, Montreal (CA)

(73) Assignees: BOMBARDIER INC., Dorval (CA); AIRBUS CANADA LIMITED PARTNERSHIP, Mirabel (CA)

(*) Notice: Subject to any disclaimer, the term of this patent is extended or adjusted under 35 U.S.C. 154(b) by 118 days.

(21) Appl. No.: 16/311,531

(22) PCT Filed: Jun. 16, 2017

(86) PCT No.: PCT/IB2017/053602
§ 371 (c)(1),
(2) Date: Dec. 19, 2018

(87) PCT Pub. No.: WO2017/221122
PCT Pub. Date: Dec. 28, 2017

(65) Prior Publication Data
US 2019/0204855 A1 Jul. 4, 2019

Related U.S. Application Data

(60) Provisional application No. 62/352,873, filed on Jun. 21, 2016.

(51) Int. Cl.
G05D 1/08 (2006.01)
B64C 13/50 (2006.01)
(Continued)

(52) U.S. Cl.
CPC .......... G05D 1/085 (2013.01); B64C 13/503 (2013.01); G05D 1/0841 (2013.01); G05D 1/101 (2013.01); G06F 16/9017 (2019.01)

(58) Field of Classification Search
CPC .... G05D 1/0858; G05D 1/0816; G05D 1/085; G05D 1/0083; G05D 1/0202
See application file for complete search history.

(56) References Cited

U.S. PATENT DOCUMENTS 2,893,662 A  7/1959  Noxon
3,812,333 A  5/1974  Mineck et al.
(Continued)

OTHER PUBLICATIONS

See also Flightlab Ground School, chapter 4, lateral/ directional stability, 2009, pp. 1-16, available at http://www.flightlab.net/Flightlab.net/Download_Course_Notes_files/4_LateralDirectional%232BA14D.pdf (Year: 2009).*

(Continued)

Primary Examiner — Kenneth J Malkowski
(74) Attorney, Agent, or Firm — Norton Rose Fulbright Canada LLP

(57) ABSTRACT

The present disclosure provides methods and system for controlling the operation of a fly-by-wire aircraft. One or more yaw commands are received from an operator control, and one or more actual induced rolls rates are determined based on the yaw commands. A yaw signal and a roll-countering command are sent to flight control components of the aircraft, the yaw signal to cause a yaw motion in the aircraft, and the roll-countering command to counter the actual induced rolls. A standardized roll rate command is determined based on the yaw command, and the standardized roll rate command is sent to the flight control components to cause a roll motion in the aircraft.

17 Claims, 8 Drawing Sheets

(51) Int. Cl.
    *G06F 16/901*    (2019.01)
    *G05D 1/10*      (2006.01)

(56)         References Cited

U.S. PATENT DOCUMENTS

| | | | |
|---|---|---|---|
| 4,392,203 | A | 7/1983 | Fischer et al. |
| 4,964,599 | A | 10/1990 | Farineau |
| 5,008,825 | A * | 4/1991 | Nadkarni ............ G05D 1/0083 |
| | | | 244/178 |
| 8,332,082 | B2 | 12/2012 | Christensen et al. |
| 2005/0234608 | A1 * | 10/2005 | Jaillant ................. G01C 23/00 |
| | | | 701/4 |
| 2012/0118194 | A1 * | 5/2012 | Schneider ................ B61F 5/24 |
| | | | 105/171 |
| 2013/0226374 | A1 * | 8/2013 | Hagerott ............. G05D 1/0841 |
| | | | 701/3 |
| 2014/0339372 | A1 * | 11/2014 | Dekel ................... B64C 39/024 |
| | | | 244/7 R |
| 2016/0194074 | A1 * | 7/2016 | Hagerott ................ B64C 13/16 |
| | | | 701/5 |

OTHER PUBLICATIONS

International Search Report and Written Opinion dated Sep. 20, 2017 in connection with PCT application No. PCT/IB2017/053602.
V. Stepanyan et al., "Stability and Performance Metrics for Adaptive Flight Control", American Institute of Aeronautics and Astronautics, Aug. 2009, 19 pages.

\* cited by examiner

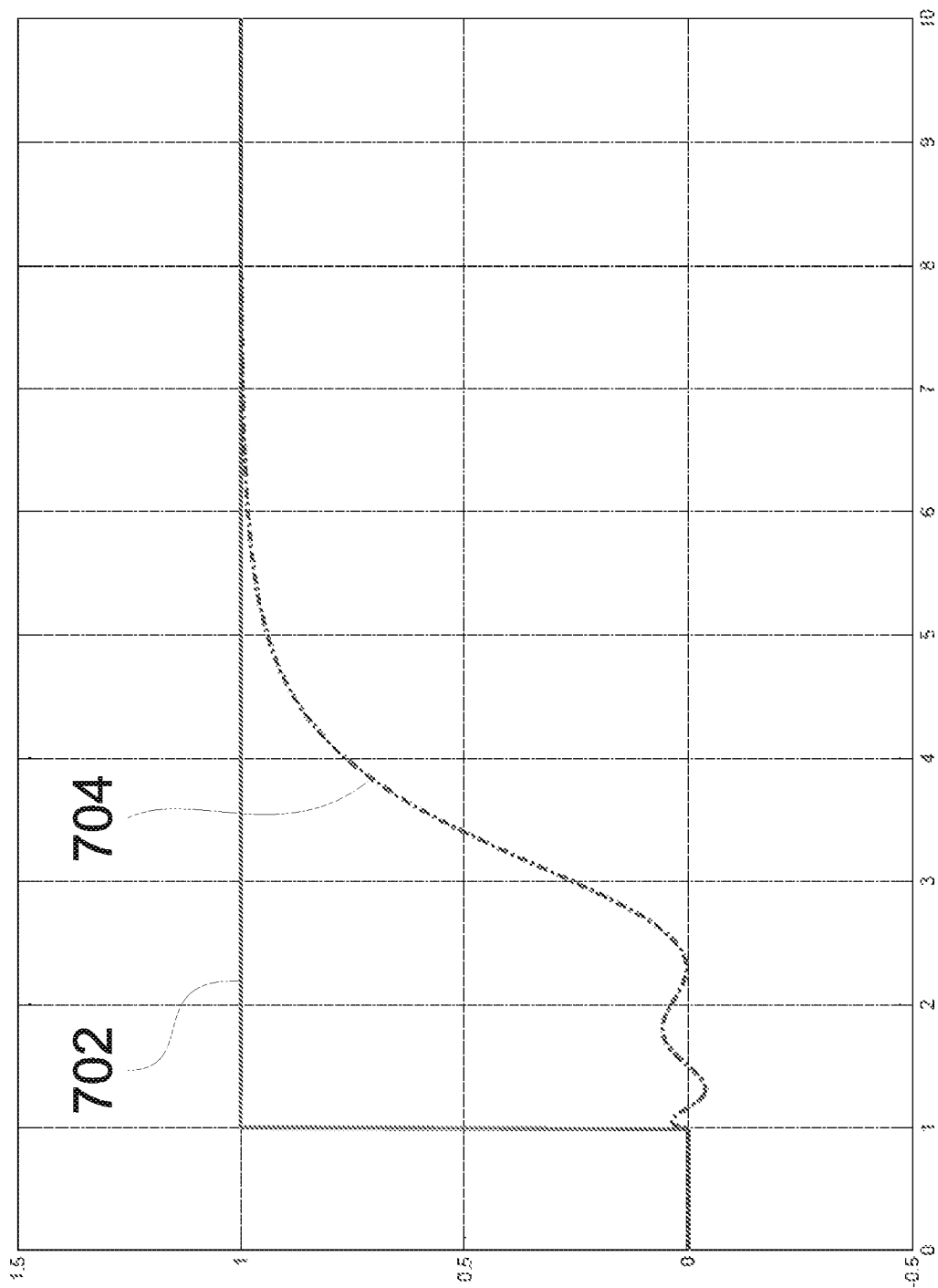

CONTROL LAWS FOR PEDAL-TO-ROLL COUPLING

CROSS-REFERENCE TO RELATED APPLICATIONS

The present application claims the benefit of U.S. Provisional Patent Application No. 62/352,873 filed on Jun. 21, 2016, the contents of which are hereby incorporated by reference.

TECHNICAL FIELD

The present disclosure relates generally to fly-by-wire aircraft, and more specifically to control laws governing aircraft motions.

BACKGROUND OF THE ART

While traditional aircraft were largely mechanical systems, many modern aircraft have adopted so-called "fly-by-wire" technology. Put briefly, traditional aircraft use mechanical linkages to translate an operator command, such as a pedal being pressed or a flight stick being tilted, to cause flight control components to move, for example an aileron being raised or lowered. In contrast, fly-by-wire aircraft convert operator commands into electrical signals, whether analog or digital. A fly-by-wire controller processes the received operator commands to generate control signals which are then sent to flight control components. The flight control components then modify their behavior based on the received signals.

In a traditional aircraft, a yaw motion (change in the heading of an aircraft) is accompanied with a roll motion (roll rate), which is induced by a difference in relative pressure on the wings due to a change in relative speed of the wings. However, certain fly-by-wire (FBW) aircraft manufacturers have used FBW technology to "decouple" certain aircraft motions. For example, by processing a yaw command to generate and send signals to both rudder(s) and aileron(s) of an aircraft, the induced roll motion can be countered, and the aircraft will only yaw.

Decoupling the yaw and roll motions of an aircraft has posed a challenge for pilots. Indeed, many pilots have developed habits of manually countering the induced roll by sending a separate roll command. Relearning new habits, namely not sending the separate roll command, has proved difficult for many veteran pilots. However, the actual physical response of an aircraft to a yaw command can be unpredictable, such that even seasoned pilots can over- or under-compensate for the induced roll in certain situations, such as landing in high crosswinds.

Some prior art attempts have commanded a limited bank angle change to accompany a yaw command in order to preserve some natural aircraft characteristics, but not a continual roll rate that would exist in a traditional aircraft. Other attempts cause an initial disturbance in the lateral axis based on a yaw input. These attempts require a pilot to initially manually counter the lateral axis, but will return a flight stick to neutral once the disturbance has been overcome. In contrast, in a conventional aircraft, the pilot would need to continually input a lateral command in order to compensate for the yaw motion of the aircraft.

As such, there is room for improvement.

SUMMARY

The present disclosure provides methods and system for controlling the operation of a fly-by-wire aircraft. One or more yaw commands are received from an operator control, and one or more actual induced rolls are determined based on the yaw commands. A yaw signal and a roll-countering command are sent to flight control components of the aircraft, the yaw signal to cause a yaw motion in the aircraft, and the roll-countering command to counter the actual induced rolls. A standardized roll rate command is determined based on the yaw command, and the standardized roll rate command is sent to the flight control components to cause a roll motion in the aircraft.

In accordance with a broad aspect, there is provided a method for controlling operation of an aircraft, the method comprising receiving at least one yaw command from an operator control; determining at least one actual induced roll based at least in part on the at least one yaw command; generating and sending a yaw signal to at least one first flight control component of the aircraft to cause a yaw motion in the aircraft, the yaw signal based at least in part on the at least one yaw command; generating and sending a roll-countering command to at least one second flight control component to counter the at least one actual induced roll; determining a standardized roll rate command based at least in part on the yaw command; and sending the standardized roll rate command to at least one third flight control component to cause a standardized roll motion in the aircraft.

In some embodiments, determining the standardized roll rate command comprises selecting the standardized roll rate command from a lookup table.

In some embodiments, determining the standardized roll rate command comprises calculating the standardized roll motion based at least in part on the at least one yaw command and a set of ideal conditions.

In some embodiments, sending the yaw signal, sending the roll-countering command, and sending the standardized roll rate command comprises sending the yaw signal, the roll-countering command, and the standardized roll rate command substantially simultaneously.

In some embodiments, sending the roll-countering command and sending the standardized roll rate command to the at least one second and third flight control components comprises sending the roll-countering command and the standardized roll rate command to a signal combiner; combining the roll-countering command and the standardized roll rate command into a combined roll rate command; and sending the combined roll rate command to at least some of the at least one second and third flight control components.

In some embodiments, sending the yaw signal, sending the roll-countering command, and sending the standardized roll rate command comprises sending the yaw signal and the roll-countering command substantially simultaneously and sending the standardized roll rate command a predetermined delay after the yaw signal and the roll-countering command.

In some embodiments, the method further comprises introducing a predetermined delay in the standardized roll rate command prior to sending the standardized roll rate command.

In some embodiments, the predetermined delay is on the order of 1 second.

In some embodiments, introducing a predetermined delay is performed by two second-order Padé filters.

In some embodiments, introducing a predetermined delay is performed by one fourth-order Padé filter.

In some embodiments, the at least one second flight component and the at least one third flight component are a common flight component.

According to another broad aspect, there is provided a system for controlling operation of an aircraft, the system comprising a processing unit; and a non-transitory memory communicatively coupled to the processing unit and comprising computer-readable program instructions. The computer-readable program instructions are executable by the processing unit for receiving at least one yaw command from an operator control; determining at least one actual induced roll based at least in part on the at least one yaw command; generating and sending a yaw signal to at least one first flight control component of the aircraft to cause a yaw motion in the aircraft, the yaw signal based at least in part on the at least one yaw command; generating and sending a roll-countering command to at least one second flight control component to counter the at least one actual induced roll; determining a standardized roll rate command based at least in part on the yaw command; and sending the standardized roll rate command to at least one third flight control component to cause a standardized roll motion in the aircraft.

In some embodiments, determining the standardized roll rate command comprises selecting the standardized roll rate command from a lookup table.

In some embodiments, determining the standardized roll rate command comprises calculating the standardized roll motion based at least in part on the at least one yaw command and a set of ideal conditions.

In some embodiments, sending the yaw signal, sending the roll-countering command, and sending the standardized roll rate command comprises sending the yaw signal, the roll-countering command, and the standardized roll rate command substantially simultaneously.

In some embodiments, sending the roll-countering command and sending the standardized roll rate command to the at least one second and third flight control components comprises sending the roll-countering command and the standardized roll rate command to a signal combiner; combining the roll-countering command and the standardized roll rate command into a combined roll command; and sending the combined roll command to at least some of the at least one second and third flight control components.

In some embodiments, sending the yaw signal, sending the roll-countering command, and sending the standardized roll rate command comprises sending the yaw signal and the roll-countering command substantially simultaneously and sending the standardized roll rate command a predetermined delay after the yaw signal and the roll-countering command.

In some embodiments, the program instructions are further executable by the processing unit for introducing a predetermined delay in the standardized roll rate command prior to sending the standardized roll rate command.

In some embodiments, the predetermined delay is on the order of 1 second.

In some embodiments, the processing unit comprises at least one filter for introducing the predetermined delay.

In some embodiments, wherein the at least one filter comprises two second-order Padé filters or one fourth-order Padé filter.

In some embodiments, the at least one second flight component and the at least one third flight component are a common flight component.

Features of the systems, devices, and methods described herein may be used in various combinations, and may also be used for the system and computer-readable storage medium in various combinations.

BRIEF DESCRIPTION OF THE DRAWINGS

Further features and advantages of embodiments described herein may become apparent from the following detailed description, taken in combination with the appended drawings, in which:

FIG. 7 is a graphical representation of example standardized roll rate command, in accordance with an embodiment.

It will be noted that throughout the appended drawings, like features are identified by like reference numerals.

DETAILED DESCRIPTION

Some modern aircraft use fly-by-wire (FBW) control systems to assist pilots with operation of the aircraft. One way in which FBW control systems can assist pilots is by decoupling certain aircraft motions. For example, a FBW control system can be used to cancel or counter a roll motion induced in the aircraft as a result of yaw motion. However, this decoupling of yaw and roll motions can pose a problem for veteran pilots who have developed habits of manually countering the induced roll rate. Once countering of the induced roll rate has been performed, it is envisaged to introduce a standardized roll rate, in order to allow pilots to manually counter a roll motion independent of environmental factors, such as strong crosswinds, and the like. More specifically, an actual roll rate that would result from a given yaw command in a given set of conditions is countered, and a standardized roll rate is instead induced.

Figure 1:
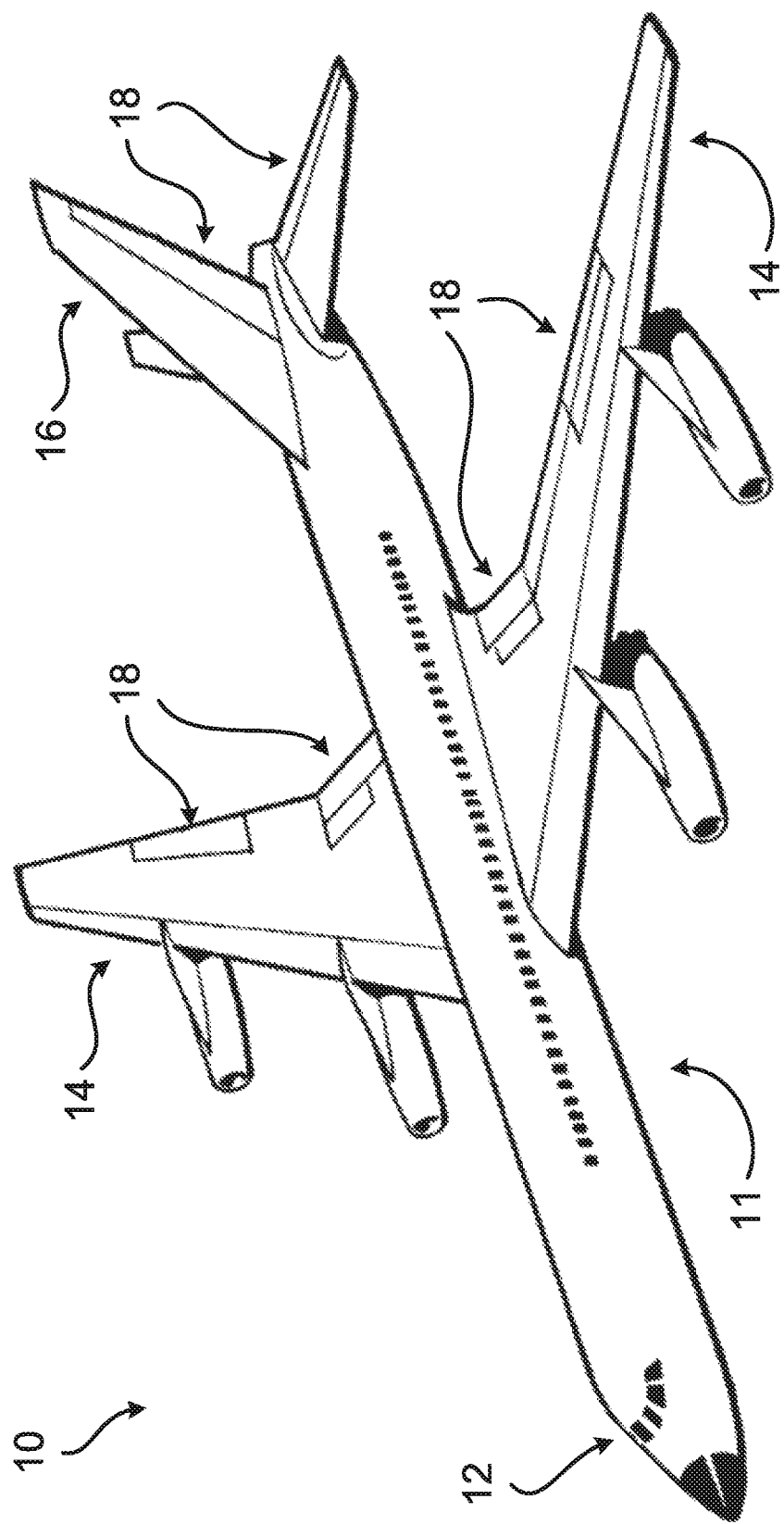
FIG. 1 is a diagram of an example aircraft.

With reference to FIG. 1, a typical modern aircraft 10, having a fuselage 11, a pair of wings 14, and a tail 16, is equipped with a cockpit 12 and one or more flight control component 18. The aircraft 10 can be any type of aircraft, including propeller planes, jet planes, turbojet planes, turbopropeller planes, turboshaft planes, gliders, and the like. The cockpit 12 may be positioned at any suitable location on the aircraft, for example at a front portion of the fuselage 11. The cockpit 12 is configured for accommodating one or more pilots who control the operation of the aircraft by way of one or more operator controls (not illustrated). The operator controls may include any suitable number of pedals, yokes, steering wheels, centre sticks, flight sticks, levers, knobs, switches, and the like.

The flight control components 18 can be positioned at any suitable location on the aircraft, and may include any suitable number of ailerons, airbrakes, elevators, flaps, flaperons, rudders, spoilers, spoilerons, stabilators, trim tabs, and the like. In one particular embodiment of the aircraft 10, each wing 14 is equipped with at least one aileron, and the tail 16 has at least one rudder and at least one elevator. The aircraft 10 can also be equipped with any number of additional suitable flight control components 18. In some further embodiments, the flight control components 18 include one or more thrust vectoring elements.

Figure 2:
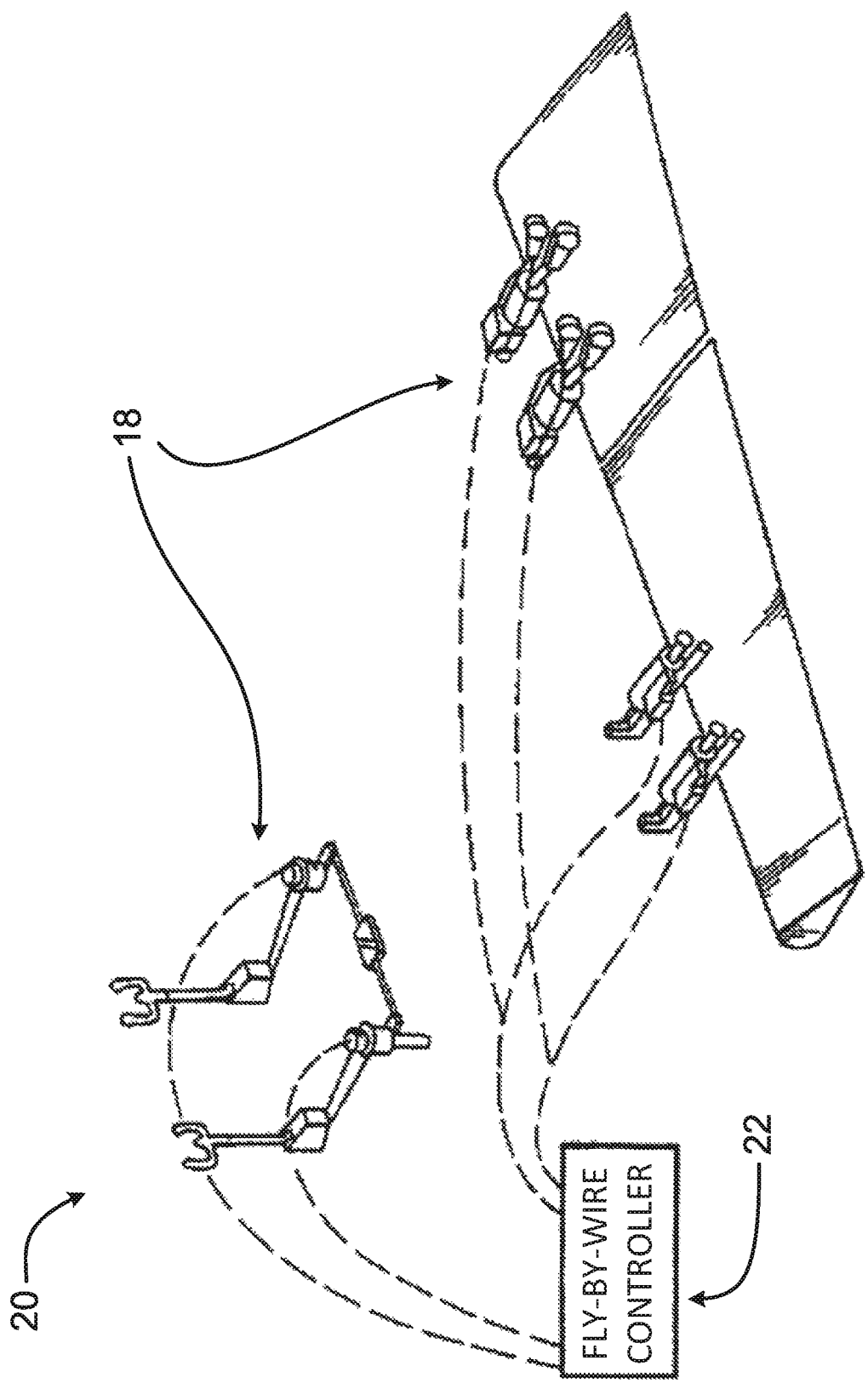
FIG. 2 is a block diagram of an example fly-by-wire implementation, according to an embodiment.

With reference to FIG. 2, the aircraft 10 may use a fly-by-wire (FBW) control system 20 which has a FBW controller 22 which controls the operation of the flight control components 18. In the FBW control system 20, there is no direct mechanical coupling between the operator controls and the flight control components 18. The FBW control system 20 includes the operator controls which provide operator commands, in the form of electrical signals, to the FBW controller 22. The FBW controller 22 may combine the operator commands with other aircraft data to produce flight control signals. Instead of mechanical linkages and their attendant displacement/translation, the commands are transmitted across wires to electrically control the movement of actuator/motors that move the flight control components 18. For purposes of safety, the FBW control system 20 includes redundant components (not illustrated) when needed so that if one component of the FBW control system 20 fails, the aircraft can still be safely controlled. In some embodiments, redundancy is provided on an axis-by-axis basis. For example, the FBW control system 20 has separate systems that control the movement of the aircraft in each of the roll, pitch and yaw axes.

Figure 3:
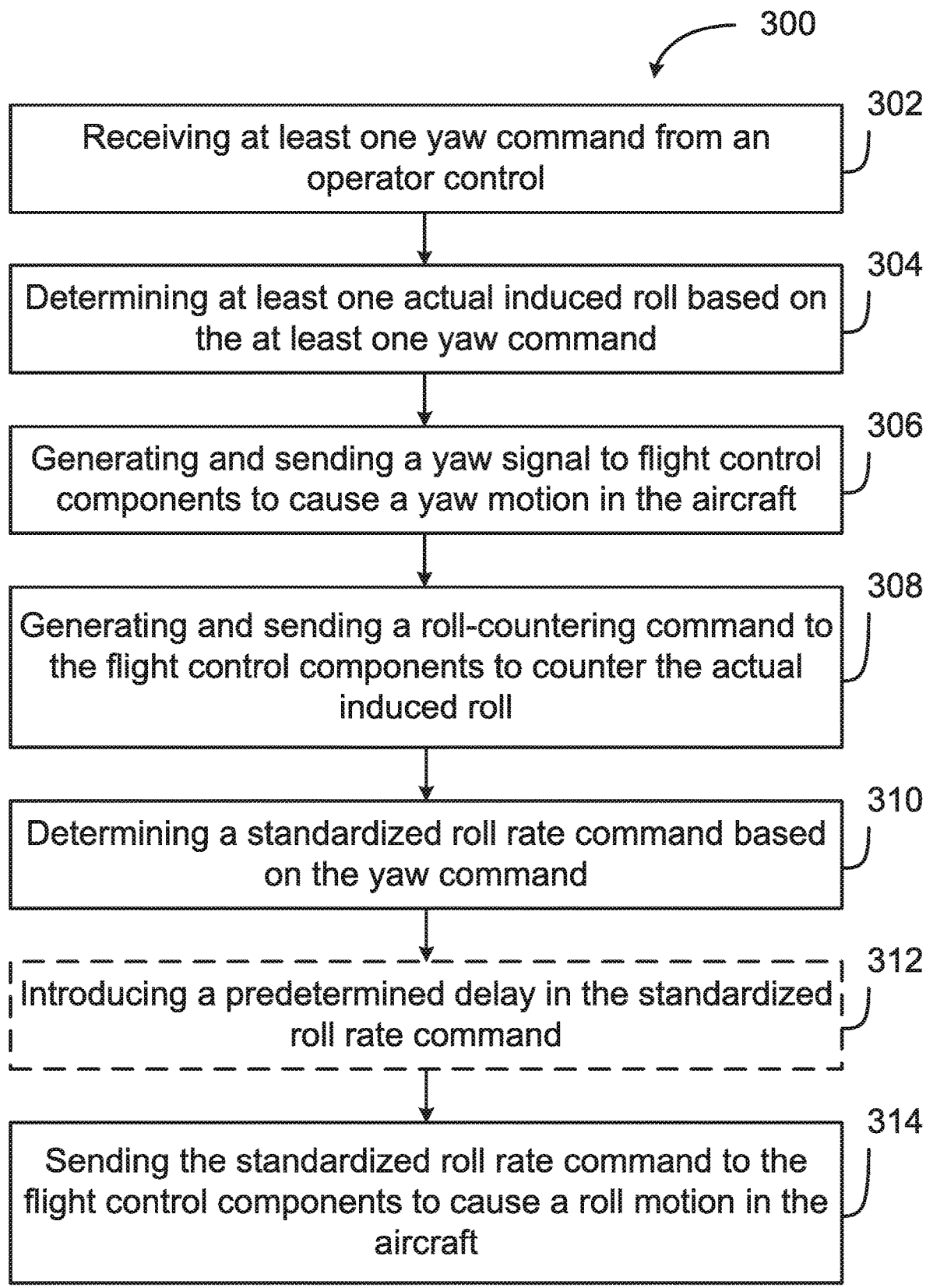
FIG. 3 is a flowchart of a method for controlling operation of an aircraft in accordance with an embodiment.

With reference to FIG. 3, the FBW control system 20 is configured for implementing a method 300 for controlling operation of an aircraft, such as the aircraft 10. At step 302, at least one yaw command is received from an operator control. The command may be received from any suitable operator control, for example from a yaw pedal. Additionally, the command may be received as an analog electrical signal or a digital electrical signal, and may be received in any suitable format. The received yaw command is indicative of a desired yaw motion to be imparted to the aircraft 10. The yaw command may be received, for example, by the FBW controller 22, or by another suitable element of the FBW control system 20.

At step 304, at least one actual induced roll is determined based at least in part on the at least one yaw command received at step 302. Due to the physical properties of the aircraft 10, the yaw motion will induce an associated roll motion. Moreover, various environmental factors, such as strong crosswinds, variations in pressure, and the like, can impact the magnitude and/or direction of the induced roll motion. Thus, using the particular physical properties of the aircraft 10, the environmental factors to which the aircraft is subjected, and the yaw command, the actual induced roll motion can be determined. For example, the FBW controller 22 is provided with one or more computation units which are configured for calculating the induced roll based at least in part on the yaw command. One or more sensors (not illustrated) located on the aircraft 10 can collect environmental data about the environmental factors to which the aircraft 10 is subjected, and the FBW controller can determine the actual induced roll motion for the aircraft 10 on the basis of these environmental factors as well.

At step 306, a yaw signal is generated and sent to at least one first flight control component of the flight control components 18 to cause a yaw motion in the aircraft. The yaw signal can be generated and sent, for example, by the FBW controller 22. The yaw signal can be sent as an analog electrical signal or a digital electrical signal, and may be sent in any suitable format. In some embodiments, the yaw signal is indicative of an amount of deflection to be applied to one or more flight control components 18. In some embodiments, the yaw signal is indicative of an amount of time during which the deflection should be maintained. In other embodiments, the yaw signal is any signal suitable for causing the aircraft 10 to be imparted the desired yaw motion. The yaw signal may be based at least in part on the at least one yaw command.

At step 308, a roll-countering command is generated and sent to at least one second flight control component of the flight control components 18 to counter the actual induced roll motion determined in step 304. The roll-countering command can be generated and sent, for example, by the FBW controller 22. The roll-countering command can be any suitable signal in any suitable format, for example a format resembling that of the yaw signal of step 306. In some embodiments, step 308 may be performed substantially simultaneously with step 306, such that both the roll-countering command and the yaw signal are sent to the flight control components 18 at substantially the same time.

At step 310, a standardized roll rate command is determined based at least in part on the yaw command. The standardized roll rate command serves to cause a roll motion in the aircraft 10 that is substantially similar to a roll motion to which the aircraft 10 would be subjected in ideal conditions as a result of the yaw motion caused by the yaw command. For example, ideal conditions may include no crosswind, equal wing pressure, equal weight distribution, a predetermined centre-of-gravity, and the like. This standardized roll rate command can be used with non-conventional aircrafts, where a roll may not naturally be induced by a yaw (or roll is induced in an unconventional manner) to provide pilots with a conventional feel. In this way, the ideal roll motion may not be related to the natural motion of the current aircraft, but rather an ideal response determined from experience on other aircrafts.

The standardized roll rate command may be obtained from a lookup table or other database by using the yaw command, or may be calculated based on the yaw command, using, for example, known parameters relating to the aircraft 10. In some embodiments, a set of ideal conditions are used as part of a simulation environment to determine the roll motion of the aircraft 10 under ideal conditions based on the yaw command. The standardized roll rate command can be any suitable signal in any suitable format, for example a format resembling that of the yaw signal of step 306.

Optionally, at step 312, a predetermined delay is introduced in a standardized roll rate command which is based on the standardized roll rate command. The delay may be of any suitable length, and may be introduced in any suitable way. For example, the delay may be on the order of 0.5 seconds, 1 second, 1.5 seconds, 2 seconds, 2.5 seconds, 3 seconds, or any other suitable duration. In some embodiments, the delay introduced at step 312 is relative to the generating and/or the sending of the yaw signal. In other embodiments, the delay introduced at step 312 is relative to the generating and/or the sending of the roll-countering command. In further embodiments, the yaw signal and the roll-countering command are sent substantially simultaneously, and the delay introduced at step 312 is relative to both the generating and/or the sending of the yaw signal and the roll-countering command.

The delay may be introduced by modifying the standardized roll rate command itself. For example, the standardized roll rate command can be implemented as an analog signal which is fed through one or more filters (or other delay blocks). Alternatively, the standardized roll rate command can be implemented as a digital signal which is sent through one or more latches or flipflops which delay the transmission of the signal. Other methods of delaying the standardized roll rate command are also considered. By delaying the transmission of the standardized roll rate command, the motions imparted to the aircraft 10 are staggered: first, in response to the yaw signal and the roll-countering command, the aircraft 10 will undergo a yawing motion, and the induced roll motion will be cancelled. Then, in response to the standardized roll rate command, the aircraft 10 will undergo a standardized roll motion. A pilot of the aircraft 10, then, is afforded a delay between the beginning of the yaw motion and the beginning of the standardized roll motion in which to prepare to manually counter the standardized roll motion. This may reduce pilot workload, as actions performed by the pilot of the aircraft 10 occur sequentially, rather than simultaneously.

At step 314, the standardized roll rate command is sent to at least one third flight control component of the flight control components 18 to cause a roll motion in the aircraft. The roll motion caused by the standardized roll rate command may be substantially similar to a roll motion induced to the aircraft 10 by the yaw command under ideal conditions. So, for an example aircraft 10, if the yaw command causes a 10° deflection in the heading of the aircraft 10, under ideal conditions (no crosswind, ideal pressure, appropriate weight distribution within the aircraft, etc.) the induced roll would cause a 3°/s roll rate of the aircraft 10. However, due to environmental factors, the actual induced roll motion can be significantly larger, for example 5°/s roll rate. In this scenario, the yaw command causes a 10° deflection in the heading of the aircraft 10, the roll-countering command counters the 5°/s actual induced roll rate, and the standardized roll rate command causes the aircraft to roll 3°/s. These values are examples, and other values may also apply.

In one particular embodiment, the yaw signal generated and sent at step 306 is sent to the rudders on the tail 16 of the aircraft 10, and the roll-countering command generated and sent at step 308 as well as the standardized roll rate command sent at step 314 are sent to the ailerons on the wings 14 of the aircraft 10. In other embodiments, the yaw signal, roll-countering command, and standardized roll rate command may be sent to one or more other suitable flight control components 18. Thus, in some embodiments, the first, second, and/or third flight control components correspond to the same flight control components, or share at least some of the flight control components 18 amongst themselves. For example, both the second and third flight control components can include ailerons on the wings 14 of the aircraft 10. In some embodiments, the yaw signal, the roll-countering command and the standardized roll rate command each command only one type of flight control components 18, or may command multiple types of flight control components.

In some other embodiments, the roll-countering command and the standardized roll rate command are sent to an intermediary component, such as a signal combiner. The roll-countering command and the standardized roll rate command are then combined into a single unified roll command, and the unified roll command is then sent to the second and third flight control components of the flight control components 18. Thus, if the roll-countering command and the standardized roll rate command would separately command some of the flight control components 18 to move in opposite directions, the unified roll command sent to the second and third flight control components then only commands movement representative of the difference between what would have been commanded by the signals separately. In some further embodiments, the yaw signal and the roll-countering command are sent to the signal combiner and combined into a single decoupled yaw signal, and the decoupled yaw signal is then sent to the first and second flight control components of the flight control components 18.

Figure 4:
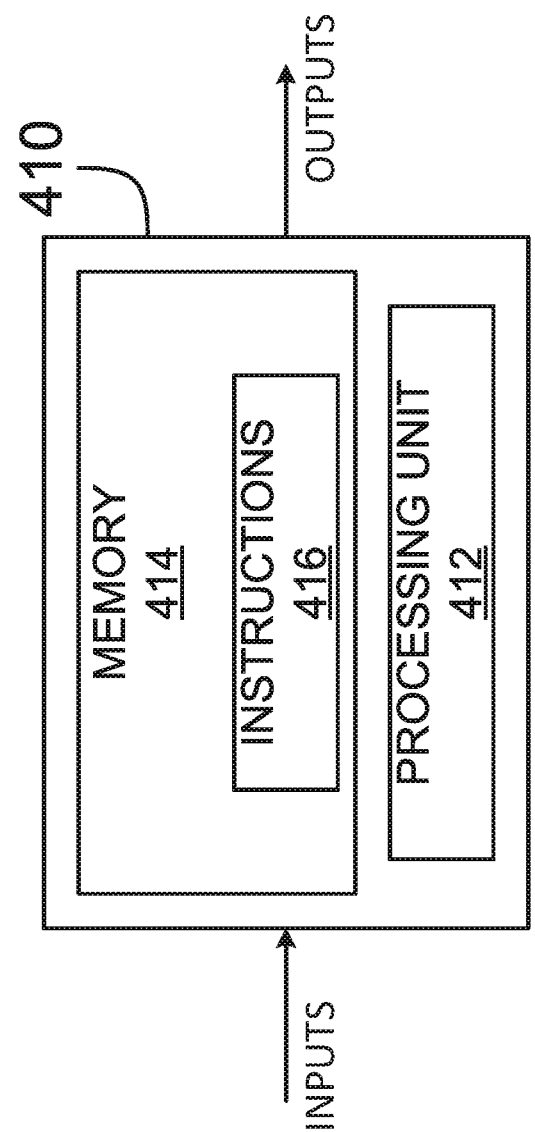
FIG. 4 is a schematic diagram of an example computing system for implementing the method of FIG. 3 in accordance with an embodiment.

With reference to FIG. 4, the method 300 may be implemented by a computing device 410, comprising a processing unit 412 and a memory 414 which has stored therein computer-executable instructions 416. The processing unit 412 may comprise any suitable devices configured to cause a series of steps to be performed so as to implement the method 300 such that instructions 416, when executed by the computing device 410 or other programmable apparatus, may cause the functions/acts/steps specified in the methods described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 may comprise any suitable known or other machine-readable storage medium. The memory 414 may comprise non-transitory computer readable storage medium such as, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory may comprise any storage means (e.g., devices) suitable for retrievably storing machine-readable instructions executable by processing unit.

Figure 5:
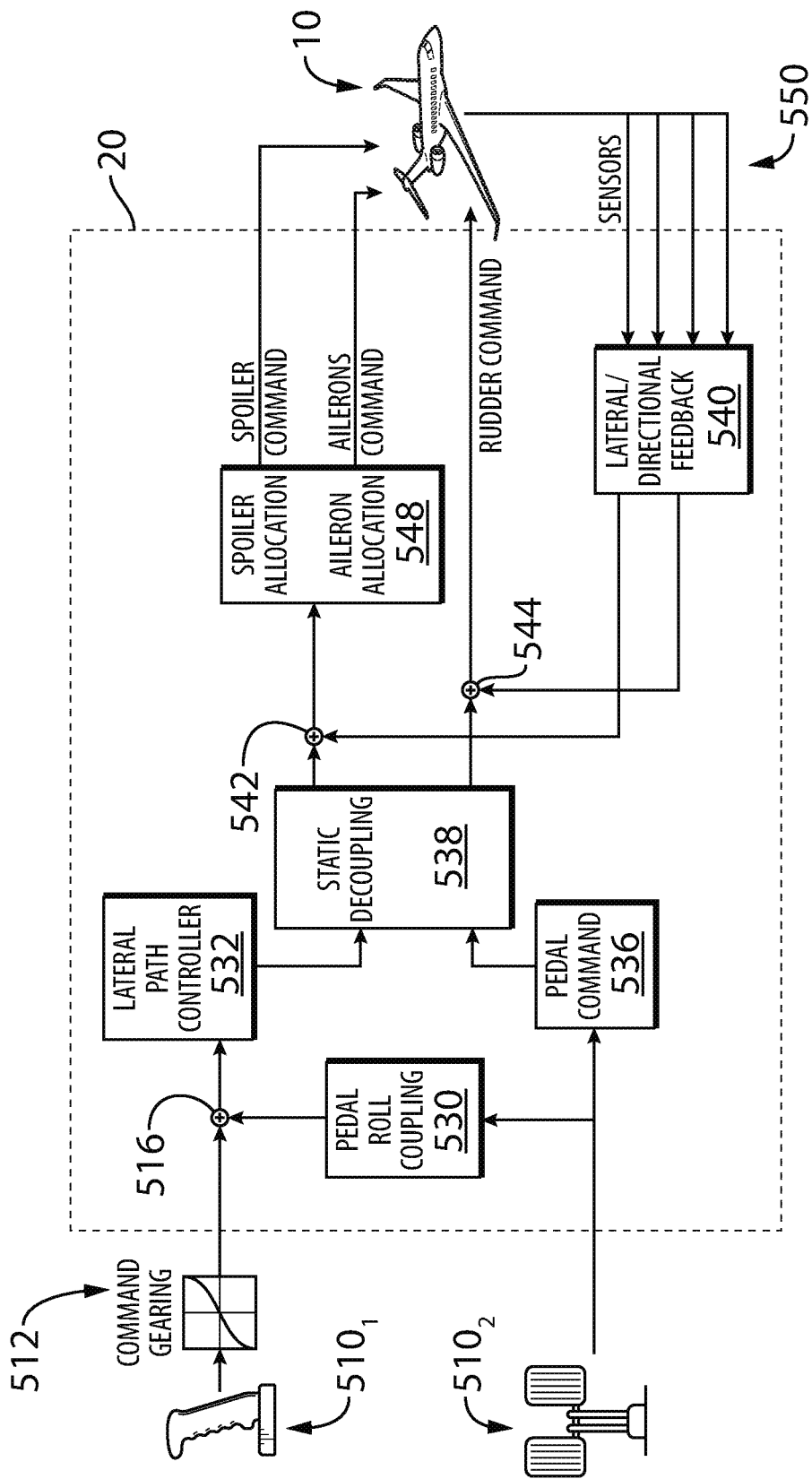
FIG. 5 is a block diagram of an example circuit for implementing an embodiment of the method of FIG. 3.

With reference to FIG. 5, an example implementation of the FBW control system 20 is illustrated. The FBW control system 20 receives inputs from a plurality of operator controls 510, such as a flight stick $510_1$, one or more pedals $510_2$, and the like. The yaw command, which may be received by the FBW control system 20 at step 302, is generated by the operator controls 510, for example by a yaw pedal $510_2$.

The yaw command is received by the FBW control system 20, or more particularly by a pedal command unit 536, in accordance with step 302. The yaw command is also sent to a pedal-to-roll coupling unit 530. Other commands generated by the operator controls 510 may be received by other elements of the FBW control system 20. For example, roll commands from flight stick $510_1$ can be provided to a lateral path control unit 532. The roll commands from flight stick $510_1$ can be sent through a command gearing unit 512 before being combined with one or more other signals, including an output of the pedal-to-roll coupling unit 530, at signal combiner 516, before being passed on to the lateral path control unit 532.

The signals output via the lateral path control unit 532 and the pedal command unit 536 are provided to the static decoupling unit 538. The static decoupling unit provides a plurality of outputs which are provided to signal combiners 542, 544, which also receive signals from the lateral/direction feedback unit 540. The lateral/directional feedback unit 540 uses aircraft parameters 550 received from sensors (not illustrated) of the aircraft 10 to provide feedback signals which are combined with the output signals from the static decoupling unit 538. Together, the static decoupling unit 538, the lateral/directional feedback unit 540, and the signal combiners, 542, 544, cooperate to determine the at least one actual induced roll based on the at least one yaw command, in accordance with step 304. Additionally, the signals output by the signal combiners 542, 544 are provided to the aircraft 10. Thus, the static decoupling unit 538, the lateral/directional feedback unit 540, and the signal combiners, 542, 544, cooperate to generate and send the yaw signal and the roll-countering command to the flight control components 18, in accordance with steps 306 and 308.

In some embodiments, the roll-countering command is first sent through a spoiler/aileron allocation unit 548. The spoiler/aileron allocation unit 548 is configured for determining an extent to which different flight control components 18, such as spoilers and ailerons, should be used to effect the roll-countering motion. To that end, the spoiler/aileron allocation unit 548 can process the roll-countering command in any suitable way and send appropriate signals to one or more of the flight control components 18 in order to cause the roll-countering motion.

Additionally, the pedal-to-roll coupling unit 530 is configured for determining the standardized roll rate command based at least in part on the yaw command received from the yaw pedal $510_2$, in accordance with step 310. Optionally, the pedal-to-roll coupling unit 530 is also configured for introducing the predetermined delay in the standardized roll rate command, in accordance with step 312. The pedal-to-roll coupling unit 530 then outputs the standardized roll rate command, for example as a standardized roll rate command signal, which is sent to one or more the flight control components 18, in accordance with step 314. The standardized roll rate command can be output to the flight control components 18 along any suitable path, for example by following substantially the same path as the roll-countering command.

The predetermined delay optionally introduced in the standardized roll rate command can be added by any suitable means. For example, the delay is introduced using one or more Padé filters. In some embodiments, a single $4^{th}$-order Padé filter is used. In other embodiments, two $2^{nd}$-order Padé filters are used, or any other filter designed to delay or lag the input signal. In still other embodiments, the delay may be added in software, for example by storing the signal in a memory and retransmitting the signal toward the flight control components 18 once the predetermined delay has passed. Alternatively, the aforementioned Padé filters can be simulated in software.

Figure 6:
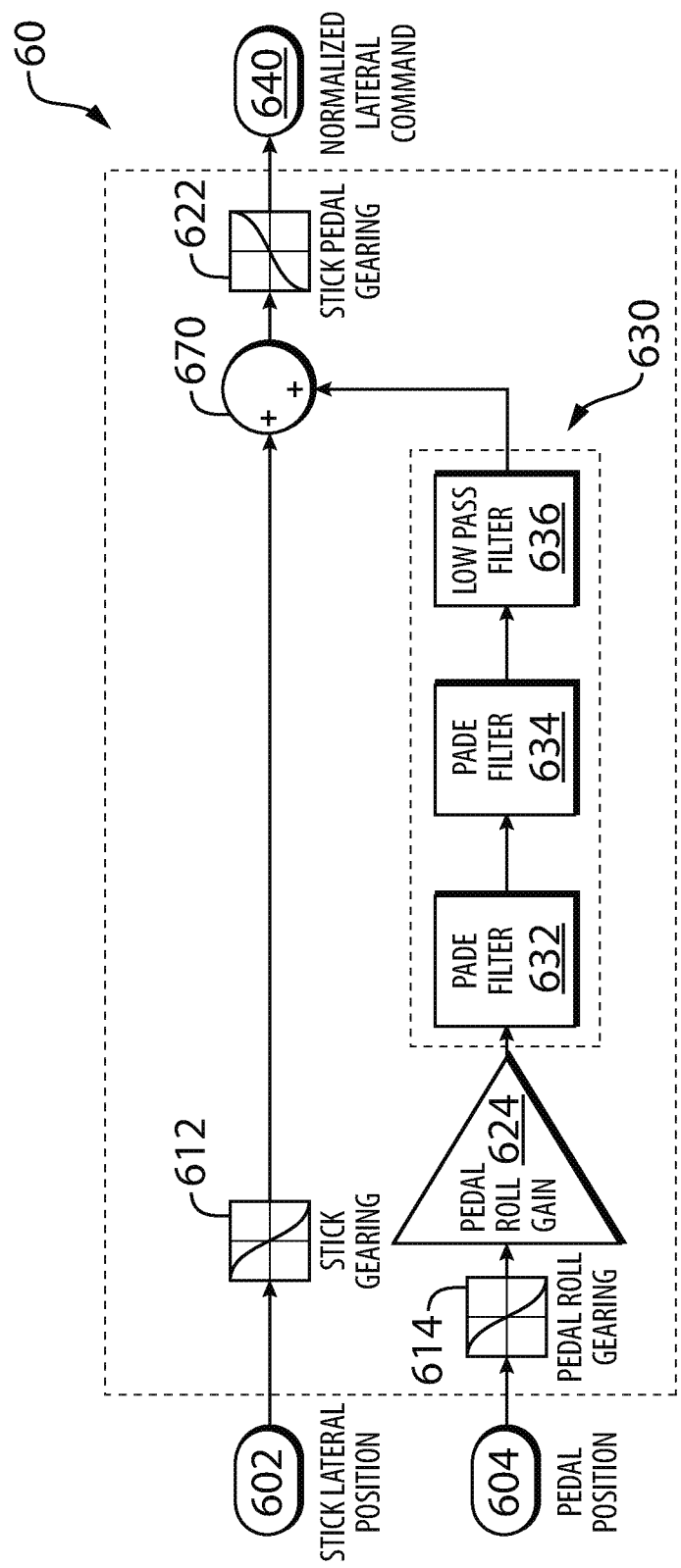
FIG. 6 is a block diagram of an example control laws diagram.

With reference to FIG. 6, an embodiment of control laws 60 for introducing a predetermined delay in the standardized roll rate command is shown. In this embodiment, a configuration using two $2^{nd}$-order Padé filters is used to introduce the predetermined delay in the standardized roll rate command. A plurality of inputs is received by the control laws 60, including a flight stick input 602 and a pedal input 604. The control laws 60 includes a stick gearing unit 612, a pedal-roll gearing unit 614, a stick-pedal gearing unit 622, a pedal-roll amplifier 624, a signal combiner 670, as well as a delay unit 630.

The flight stick input 602 provides a flight stick signal which is sent to the stick gearing unit 612, which provides the flight stick signal to the signal combiner 670. The delay unit 630 comprises a pair of $2^{nd}$-order Padé filters 632, 634, and a low pass filter 636. The delay unit 630 receives an amplified pedal-to-roll signal, which is obtained by sending a pedal-to-roll signal from the pedal/roll gearing input 604 through a pedal-to-roll gearing unit 614 and through a pedal-to-roll amplifier 624. The output of the first $2^{nd}$-order Padé filter 632 is routed to the input of the second $2^{nd}$-order Padé filter 634. The second $2^{nd}$-order Padé filter provides an output signal to the low pass filter 636, which provides the delayed standardized roll rate command to the signal combiner 670.

It should be noted that since the introduction of a delay in the standardized roll rate command is optional, the delay unit 630 shown in FIG. 6 is not always included in the FBW control system 20. In other embodiments, the delay unit 630 does not include the $2^{nd}$-order Padé filters 632, 634, and a $1^{st}$-order lag unit 636, and the standardized roll rate command is delayed using a different implementation of the delay unit 630.

The signal combiner 670 combines the flight stick signal and the delayed standardized roll rate command and outputs a combined flight control signal to a stick pedal gearing unit 622. The stick pedal gearing unit 622 then outputs a normalized roll rate command signal via output 640, which is then sent to the lateral path controller 532 and eventually to the flight control components 18.

With reference to FIG. 7, a graph is shown indicating example signal levels over time for the standardized roll rate command. Line 702 is representative of the signal input to the first $2^{nd}$-order Padé filter 632, and line 704 is representative of the signal output by the $1^{st}$-order lag unit 636. Thus, the embodiment of the delay unit 630 shown in FIG. 6 causes a delay of approximately 2 seconds in the standardized roll rate command.

Figure 8A:
FIGS. 8A-D are graphical representations of various example output signals of elements of the circuit of FIG. 6.
Figure 8B:
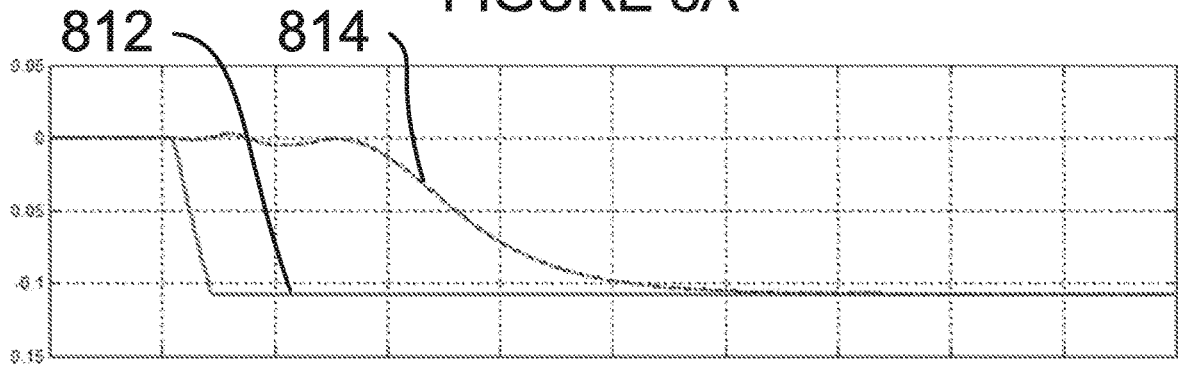
Figure 8C:
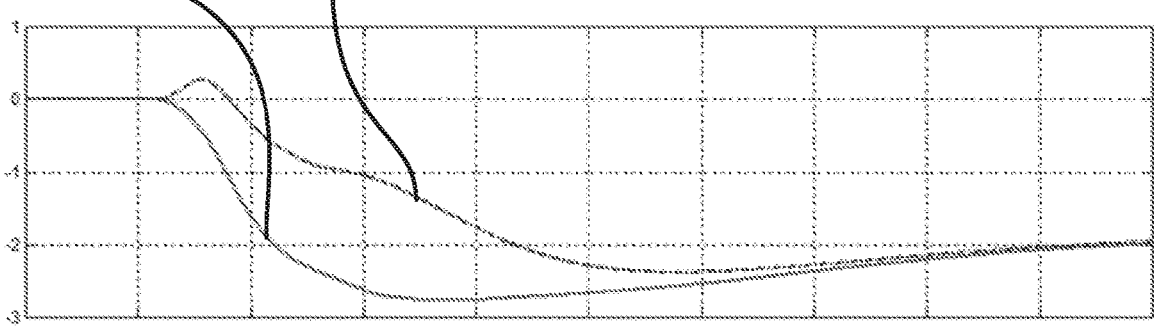
Figure 8D:
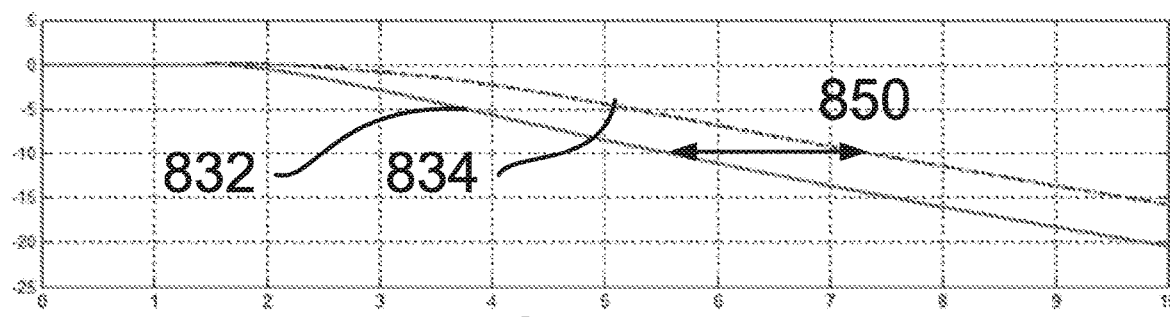

With reference to FIGS. 8A-D, various signals from the circuit of FIG. 6 are shown. In FIG. 8A, line 802 shows the signal output from the pedal/roll gearing input 608 when the standardized roll rate command is not delayed, and line 804 shows the signal output from the pedal/roll gearing input 608 when the standardized roll rate command is delayed. Since the delay only acts on the standardized roll rate command and not on the pedal/roll gearing input 608, lines 802 and 804 are substantially identical. In FIG. 8B, line 812 shows the roll rate command signal output to the flight control components 18 without any delay, and line 814 shows the roll rate command signal output by the $1^{st}$-order lag unit 636. In FIG. 8C, line 822 shows the physical roll rate of the aircraft 10 in response to the standardized roll rate command without delay, and line 824 shows the physical roll rate of the aircraft 10 in response to the delayed standardized roll rate command. In FIG. 8D, the banking angle of the aircraft 10 is illustrated, where line 832 is the banking angle of the aircraft 10 in response to the standardized roll rate command with no delay, and line 834 is the banking angle in response to the delayed standardized roll rate command. Gap 850, illustrated by the double-sided arrow in FIG. 8D, is indicative of the delay caused by embodiments of the delay unit 630 which adds a delay to the standardized roll rate command. In this embodiment, the gap 850 is of roughly 2 seconds, though other embodiments of the delay unit 630 may add delays of other magnitudes.

The methods and circuits for controlling the operation of an aircraft 10 described herein may be implemented in a high level procedural or object oriented programming or scripting language, or a combination thereof, to communicate with or assist in the operation of a computer system, for example the computing device 410. Alternatively, the methods and circuits for controlling the operation of an aircraft described herein may be implemented in assembly or machine language. The language may be a compiled or interpreted language. Program code for implementing the methods and circuits for controlling the operation of an aircraft described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and circuits for controlling the operation of an aircraft described herein may also be considered to be implemented by way of a non-transitory computer-readable storage medium having a computer program stored thereon. The computer program may comprise computer-readable instructions which cause a computer, or more specifically the at least one processing unit of the computer, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Various aspects of the methods and circuits for controlling the operation of an aircraft disclosed herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the preferred embodiments set forth in the examples, but should be given the broadest reasonable interpretation consistent with the description as a whole.

The invention claimed is:

1. A method for controlling an operation of an aircraft, the method comprising:
   receiving a yaw command from a pilot of the aircraft;
   calculating, based on the yaw command, a first roll motion induced by a yaw motion of the aircraft associated with the yaw command;
   generating a first roll-countering command to counter the calculated first roll motion;
   generating, based on the yaw command, a roll-causing command to cause a second roll motion of the aircraft expected from the yaw motion of the aircraft associated with the yaw command;
   controlling the aircraft to cause the yaw motion of the aircraft based on the yaw command, the yaw motion of the aircraft inducing the first roll motion of the aircraft;
   when the aircraft is controlled to cause the yaw motion of the aircraft based on the yaw command:
      controlling the aircraft to counter the first roll motion of the aircraft induced by the yaw motion based on the first roll-countering command;
      controlling the aircraft to cause the second roll motion of the aircraft based on the roll-causing command;
      receiving a second roll-countering command from the pilot to counter the second roll motion of the aircraft; and
      controlling the aircraft to counter the second roll motion of the aircraft based on the second roll-countering command received from the pilot.

2. The method of claim 1, wherein determining the roll-causing command comprises selecting the roll-causing command from a lookup table.

3. The method of claim 1, wherein generating the roll-causing command comprises calculating the second roll motion based at least in part on the yaw command.

4. The method of claim 1, comprising
   after a predetermined delay of initiating controlling the aircraft to cause the yaw motion, initiating to control the aircraft to cause the second roll motion of the aircraft based on the roll-causing command.

5. The method of claim 1, further comprising introducing a predetermined delay in the roll-causing command prior to controlling the aircraft to cause the second roll motion of the aircraft based on the roll-causing command.

6. The method of claim 5, wherein the predetermined delay is on the order of 1 second.

7. The method of claim 5, wherein introducing a predetermined delay is performed by two second-order Padé filters.

8. The method of claim 5, wherein introducing a predetermined delay is performed by one fourth-order Padé filter.

9. The method of claim 1, comprising combining the first roll-countering command and the roll-causing command into a unified roll command, wherein controlling the aircraft to counter the first roll motion and controlling the aircraft to cause the second roll motion include controlling the aircraft based on the unified roll command.

10. A system for controlling an operation of an aircraft, the system comprising:
    a processing unit; and
    a non-transitory memory communicatively coupled to the processing unit and comprising computer-readable program instructions executable by the processing unit for:
       receiving a yaw command from a pilot of the aircraft;
       calculating, based on the yaw command, a first roll motion induced by a yaw motion of the aircraft associated with the yaw command;
       generating a first roll-countering command to counter the calculated first roll motion;
       generating, based on the yaw command, a roll-causing command to cause a second roll motion of the aircraft expected from the yaw motion of the aircraft associated with the yaw command;
       controlling the aircraft to cause the yaw motion of the aircraft based on the yaw command, the yaw motion of the aircraft inducing the first roll motion of the aircraft;
       when the aircraft is controlled to cause the yaw motion of the aircraft based on the yaw command:
          controlling the aircraft to counter the first roll motion of the aircraft induced by the yaw motion based on the first roll-countering command;
          controlling the aircraft to cause the second roll motion of the aircraft based on the roll-causing command;
          receiving a second roll-countering command from the pilot to counter the second roll motion of the aircraft; and
          controlling the aircraft to counter the second roll motion of the aircraft based on the second roll-countering command received from the pilot.

11. The system of claim 10, wherein determining the roll-causing command comprises selecting the roll-causing command from a lookup table.

12. The system of claim 10, wherein generating the roll-causing command comprises calculating the second roll motion based at least in part on the yaw command.

13. The system of claim 10, wherein the program instructions are further executable by the processing unit for
    after a predetermined delay of initiating controlling the aircraft to cause the yaw motion, initiating to control the aircraft to cause the second roll motion of the aircraft based on the roll-causing command.

14. The system of claim 10, wherein the program instructions are further executable by the processing unit for introducing a predetermined delay in the roll-causing command prior to controlling the aircraft to cause the second roll motion of the aircraft based on the roll-causing command.

15. The system of claim 14, wherein the predetermined delay is on the order of 1 second.

16. The system of claim 14, wherein the processing unit comprises at least one filter for introducing the predetermined delay.

17. The system of claim 16, wherein the at least one filter comprises two second-order Padé filters or one fourth-order Padé filter.

* * * * *